(12) United States Patent
Zhong et al.

(10) Patent No.: US 7,792,194 B2
(45) Date of Patent: Sep. 7, 2010

(54) MPEG ARTIFACTS POST-PROCESSED FILTERING ARCHITECTURE

(76) Inventors: Lefan Zhong, 170 Gilbert St., Santa Clara, CA (US) 95051; David Noel Babbage, II, 303 Tradewinds Dr., #6, San Jose, CA (US) 95123

( * ) Notice: Subject to any disclaimer, the term of this patent is extended or adjusted under 35 U.S.C. 154(b) by 1052 days.

(21) Appl. No.: 10/410,982

(22) Filed: Apr. 10, 2003

(65) Prior Publication Data

US 2004/0247034 A1    Dec. 9, 2004

(51) Int. Cl.
*H04N 7/18* (2006.01)
(52) U.S. Cl. .............................. 375/240.29; 375/240.26
(58) Field of Classification Search ................................ 375/240.01–240.29
See application file for complete search history.

(56) References Cited

U.S. PATENT DOCUMENTS

| | | | |
|---|---|---|---|
| 5,212,742 A | 5/1993 | Normile et al. | |
| 5,267,334 A | 11/1993 | Normille et al. | |
| 5,598,514 A | 1/1997 | Purcell et al. | |
| 5,608,652 A * | 3/1997 | Astle | 708/203 |
| 5,630,033 A | 5/1997 | Purcell et al. | |
| 6,188,799 B1 | 2/2001 | Tan et al. | |
| 6,195,389 B1 | 2/2001 | Rodriguez et al. | |
| 6,269,174 B1 | 7/2001 | Koba et al. | |
| 6,539,060 B1 | 3/2003 | Lee et al. | |
| 6,665,346 B1 * | 12/2003 | Lee et al. | 375/240.29 |
| 6,807,317 B2 * | 10/2004 | Mathew et al. | 382/266 |
| 6,950,473 B2 * | 9/2005 | Kim et al. | 375/240.29 |
| 2002/0114394 A1 | 8/2002 | Ma | |
| 2003/0020835 A1 | 1/2003 | Petrescu | |
| 2003/0161400 A1 | 8/2003 | Dinerstein et al. | |
| 2004/0095998 A1 | 5/2004 | Luo et al. | |
| 2004/0181564 A1 * | 9/2004 | MacInnis et al. | 708/322 |
| 2004/0190613 A1 | 9/2004 | Zhu et al. | |
| 2004/0190617 A1 * | 9/2004 | Shen et al. | 375/240.16 |
| 2004/0228415 A1 | 11/2004 | Wang | |
| 2005/0238103 A1 | 10/2005 | Subramaniyan et al. | |

FOREIGN PATENT DOCUMENTS

| | | |
|---|---|---|
| EP | 1283640 | 2/2003 |
| GB | 2348559 A | 4/2000 |
| WO | 2005001625 A2 | 1/2005 |

OTHER PUBLICATIONS

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.
Tourapis et al., Proc. of SPIE Conf. Vis. Comm. And Img. Processing, vol. 3, pp. 1365-1373, Jun. 2000.
Zheng, et al., Inter. Conf. Info. Systems, Analysis and Synthesis, SCI 2001-ISAS 2001, vol. 13, 2001.

* cited by examiner

*Primary Examiner*—Andy S Rao (57) ABSTRACT

A more efficient and less memory-access intensive post-processing architecture to substantially reduce blocking and ringing artifacts from decompressed video image data is provided. The post-processing architecture in accordance with the present invention implements a "pipelined" filtering process wherein a filter buffer, a blocking filter, and a ringing filter are serially connected to each other. The serial connection allows decompressed video image data to be first provided to a blocking filter for substantially reducing blocking artifacts and then the de-blocked video image data can be provided directly to a ringing filter for de-ringing without the need of an extra memory access.

27 Claims, 10 Drawing Sheets

POST-PROCESSING 100

POST-PROCESSING 100

POST-PROCESSING 300

MPEG ARTIFACTS POST-PROCESSED FILTERING ARCHITECTURE

FIELD OF THE INVENTION

The invention generally relates to computer systems, and more particularly relates to post-processing of MPEG data to remove artifacts and reduce image degradations.

BACKGROUND OF THE INVENTION

Moving Pictures Experts Groups (MPEG) is an International Standards Organization (ISO) standard for compressing video data. Video compression is important in making video data files, such as full-length movies, more manageable for storage (e.g., in optical storage media), processing, and transmission. In general, MPEG compression is achieved by eliminating redundant and irrelevant information. Because video images typically consist of smooth regions of color across the screen, video information generally varies little in space and time. As such, a significant part of the video information in an image is predictable and therefore redundant. Hence, a first objective in MPEG compression is to remove the redundant information and leaving only the true or unpredictable information. On the other hand, irrelevant video image information is information that cannot be seen by the human eye under certain reasonable viewing conditions. For example, the human eye is less perceptive to noise at high spatial frequencies than noise at low spatial frequencies and less perceptive to loss of details immediately before and after a scene change. Accordingly, the second objective in MPEG compression is to remove irrelevant information. The combination of redundant information removal and irrelevant information removal allows for highly compressed video data files.

MPEG compression incorporates various well-known techniques to achieve the above objectives including: motion-compensated prediction, Discrete Cosine Transform (DCT), quantization, and Variable-Length Coding (VLC). DCT is an algorithm that converts pixel data into sets of spatial frequencies with associated coefficients. Due to the non-uniform distribution of the DCT coefficients wherein most of the non-zero DCT coefficients of an image tend to be located in a general area, VLC is used to exploit this distribution characteristic to identify non-zero DCT coefficients from zero DCT coefficients. In so doing, redundant/predictable information can be removed. Additionally, having decomposed the video image into spatial frequencies under DCT means that higher frequencies via their associated DCT coefficients can be coded with less precision than the lower frequencies via their associated DCT coefficients thereby allowing irrelevant information to be removed. Hence, quantization may be generalized as a step to weight the DCT coefficients based on the amount of noise that the human eye can tolerate at each spatial frequency so that a reduced set of coefficients can be generated.

However, when a highly compressed video data file is decompressed, image degradations involving noise artifacts may occur in the decompressed video images. Generally, there are two types of degradation noise artifacts: blocking and ringing. A blocking artifact is typically a discontinuity between adjacent video pixel data blocks. Blocking artifacts are created when DCT coefficients of video pixel blocks are quantized and processed independently without paying consideration to the between-blocks pixel correlation. A ringing artifact is typically a local flickering near an edge. Ringing artifacts are created when high frequency DCT coefficients are truncated as a result of coarse quantizations.

Figure 1:
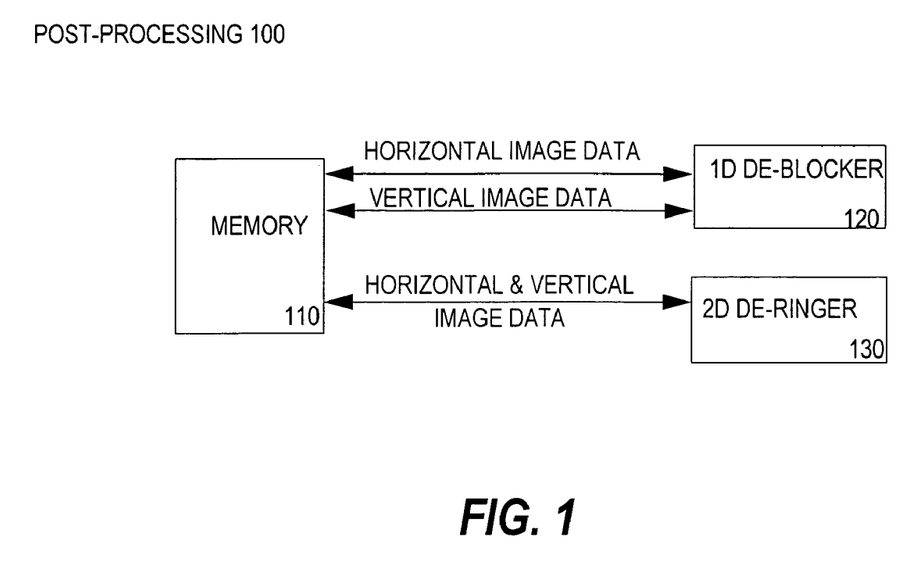
FIG. 1 illustrates a high level block diagram of a prior-art post-processing architecture for filtering blocking and ringing artifacts from decompressed video image data.

FIG. 1 is a block diagram illustrating a prior-art post-processing architecture to eliminate both blocking and ringing artifacts from decompressed video data. As shown in FIG. 1, post-processing architecture 100 includes one-dimensional (1D) blocking filter 120 and two-dimensional (2D) ringing filter 130 which are coupled to memory 110 that stores a pixmap of the decompressed (a.k.a. processed) video image data. Decompressed video image data from memory 110 can be accessed independently. In so doing, de-blocking and de-ringing processes can be performed separately. Since blocking filter 120 is a 1D filter, horizontal and vertical blocking artifacts of decompressed pixel data are filtered at different times. On the other hand, since ringing filter 130 is a 2D filter, all ringing artifacts can be substantially filtered out concurrently.

Figure 2:
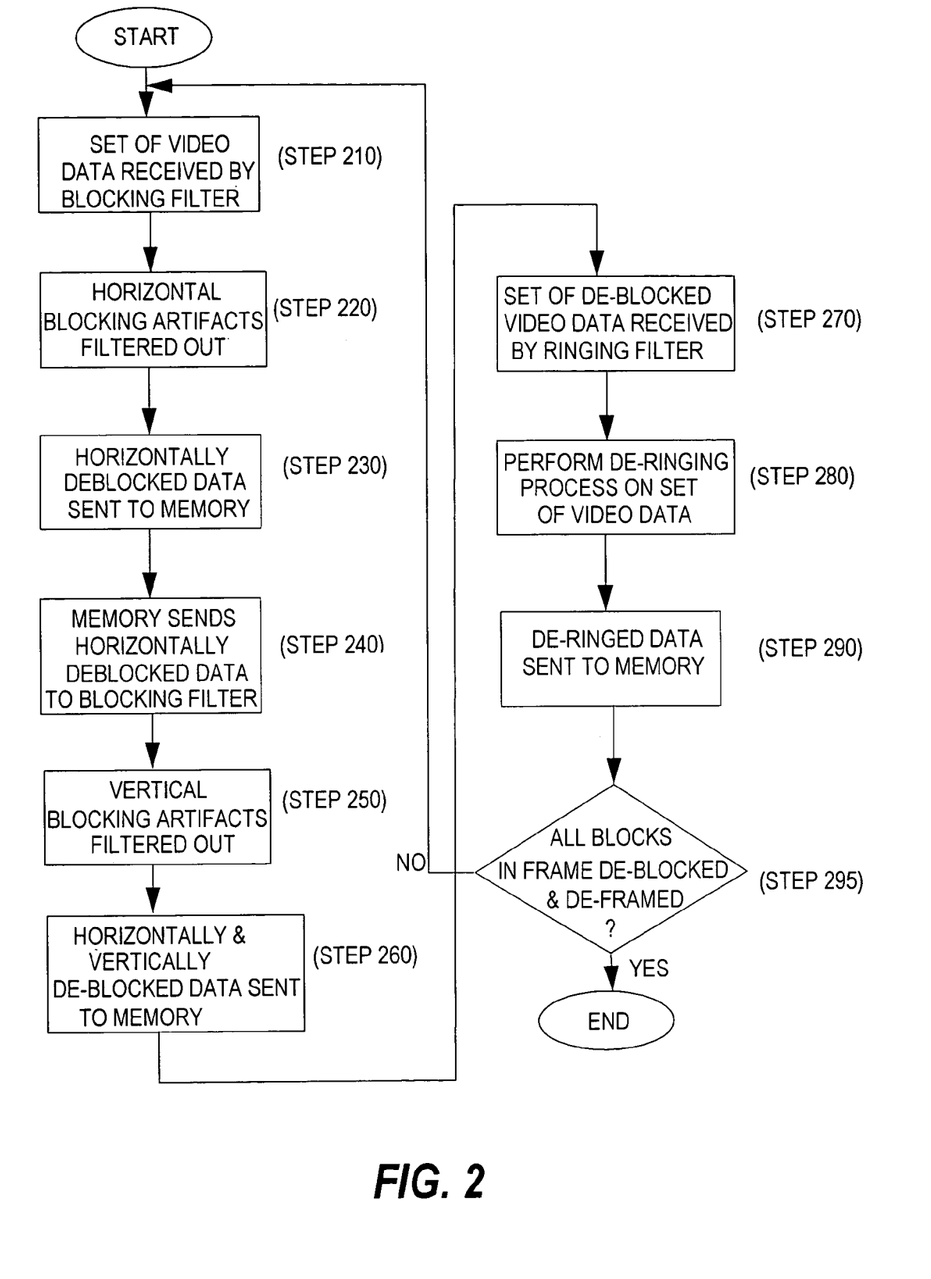
FIG. 2 is a flow chart of the steps carried out by prior-art post-processing architecture 100.

FIG. 2 is a flow chart illustrating the operation steps of post-processing architecture 100. Starting with step 210, 1D blocking filter 120 receives from memory 220 a plurality/set of decompressed pixel data (e.g., 10 pixels data) that corresponds to data between two adjacent data blocks (wherein each block is made up for example of 8×8 pixels) within an image frame. In step 220, 1D blocking filter 120 filters out the blocking artifacts in the horizontal direction. Next, blocking filter 120 sends the horizontally de-blocked pixel data back to a second location in memory 110 (step 230). Blocking filter 120 then receives the horizontally de-blocked pixel data that corresponds to the same block of the image frame from the second location in memory 220 (step 240). Blocking filter 120 filters out the blocking artifacts in the vertical direction (step 250). Blocking filter 120 then sends the vertically and horizontally deblocked pixel data back to the second location in memory 110 (step 260). Next, ringing filter 130 begins the ringing filtering process by receiving the plurality (e.g., 18×18 pixels data) of the horizontally and vertically de-blocked pixel data from memory 220 (step 270). Ringing filter 130 then filters ringing artifacts from the block of pixel data (step 280). The de-ringed pixel data is sent back to memory 110 (step 290). Next, a determination is made as to whether all blocking and ringing artifacts in all the blocks in the image frame have been filtered out (step 295). If not, steps 210-295 are repeated. Otherwise, stop. The same filtering process for the next frame may then begin.

As demonstrated above, post-processing architecture 100 requires 3 memory read and 3 memory write accesses for filtering the blocking and ringing artifacts from every block of video (pixel) data. If both blocking filter 120 and ringing filter 130 are 2D filters, then 2 memory read and 2 memory write accesses are required for each block of video (pixel) data. If both blocking filter 120 and ringing filter 130 are 1D filters, then 4 memory read and 4 memory write accesses are required for each block. More memory access means more time is required for the filtering process as well as more resources (e.g., processor time to control and monitor the memory access process) devoted to the filtering process is needed.

Thus, a need exists for a more efficient and less memory intensive post-processing apparatus, system, and method to remove blocking and ringing artifacts from decompressed video image data.

SUMMARY OF THE INVENTION

Accordingly, the present invention provides a more efficient and less memory-access intensive post-processing apparatus, system, and method to remove blocking and ringing artifacts from decompressed video image data.

The present invention meets the above need with a post-processing device that is coupled to memory and a Central Processing Unit (CPU) or with a MPEG4 video decoder. The post-processing device includes a buffer, a blocking filter connected serially to the buffer, a ringing filter connected serially to the blocking filter and the buffer, and a post-processing controller connected to the buffer, the blocking filter and the ringing filter. The buffer, the blocking filter, and the ringing filter are arranged and serially connected together in a pipeline-like fashion.

In operation, the buffer receives decompressed video data and quantization factors from the memory which in turn sends the video data and quantization factors to the blocking filter. The blocking filter substantially reduces blocking artifacts from the decompressed video data received and then sends the decompressed de-blocked video data and the quantization factors to the ringing filter. The ringing filter performs the de-ringing process on the decompressed and de-blocked video data received. This post-processing is monitored and controlled by the post-processing controller. In the preferred embodiment, the blocking filter and the ringing filter are one-dimensional which requires video data to be sent through the pipeline twice to have all the blocking artifacts removed both horizontally and vertically and to perform a two-stages de-ringing process. The buffer acts as temporary storage area to avoid system memory from being accessed unnecessarily. As such, only one memory read and one memory write are required. In another embodiment, both the blocking filter and the ringing filter are two-dimensional filters which means that video data needs to be sent through the pipeline just once which speeds up the process. As with the embodiment where both filters are one-dimensional, only one memory read and one \memory write are required. The disadvantage is that two-dimensional filters are more complex, costly, and require more real estate. In yet another embodiment, the blocking filter and ringing filter can be a combination of one-dimensional and two-dimensional filters.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention is related to MPEG compressed video image data, it is to be appreciated that the present invention is also applicable to other video compression schemes.

The post-processing architecture in accordance with the present invention implements a "pipelined" filtering process in which a filter buffer, a blocking filter, and a ringing filter are serially connected to each other. The serial connection allows decompressed video image data to be first provided to a blocking filter for removing blocking artifacts and then the de-blocked video image data can be provided directly to a ringing filter for removing ringing artifacts without the need of an extra memory access.

Figure 3:
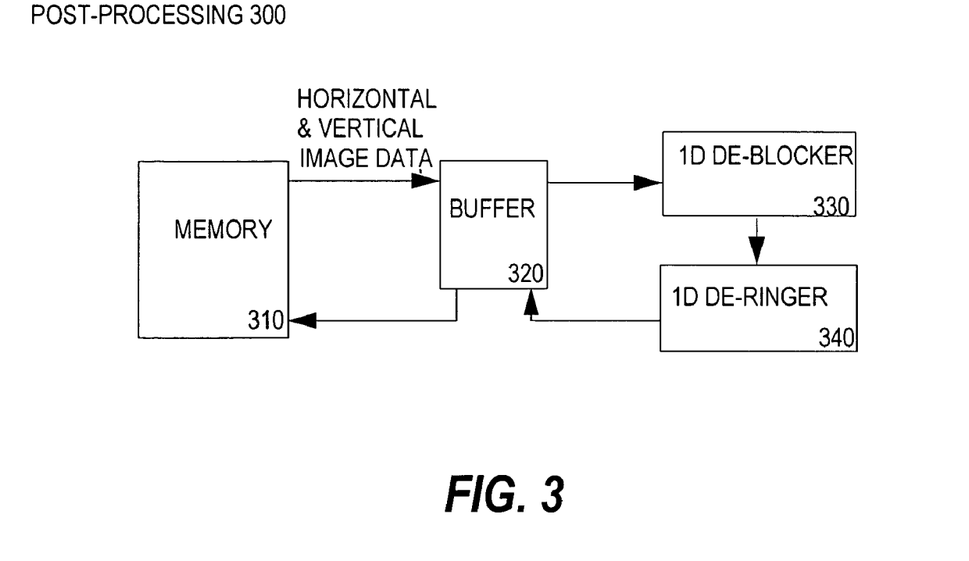
FIG. 3 illustrates a high level block diagram of the post-processing architecture for filtering blocking and ringing artifacts from decompressed video image data in accordance to the present invention.

Reference is now made to FIG. 3 illustrating a high level block diagram of the post-processing architecture in accordance to the present invention. As shown in FIG. 3, post-processing architecture 300 includes memory 310 which originally stores the decompressed (a.k.a. processed) video image data. Memory 310 is connected to buffer 320 which is in turn connected to blocking filter 330. Blocking filter 330 is then connected to ringing filter 340. Finally, ringing filter 340 is connected to buffer 320 to complete the loop. Preferably, blocking filter 330 and ringing filter 340 are one-dimensional (1D) filters. However, it should be clear to a person of ordinary skill in the art that the use of two-dimensional blocking and ringing (2D) filters as well as any combination of 1D and 2D filters are also within the scope of the present invention.

Figure 4:
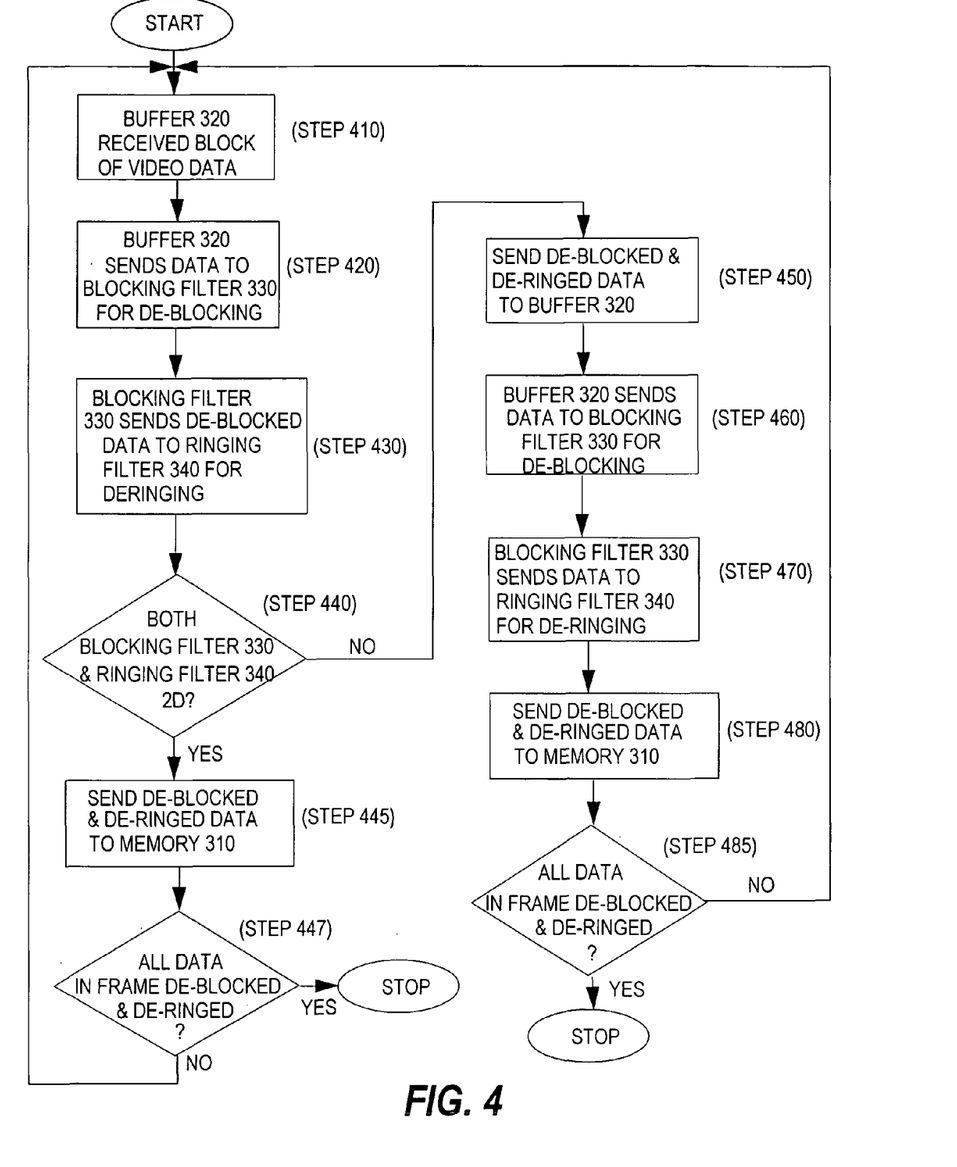
FIG. 4 illustrates a flow chart of the steps carried out by the post-processing architecture in accordance to the present invention.

Referring now to FIG. 4 illustrating a flow chart of the main steps that post-processing architecture 300 carries out. In step 410, buffer 320 receives from memory 310 a set of decompressed video data that are between data blocks (e.g., each block is made up of 8×8 pixels) within an image frame. This allows the between-blocks pixel correlation to be considered during the post-processing. Buffer 320 stores a set of 10×10 pixels data at any one time. Decompressed video data is then sent from buffer 320 to blocking filter 330 (step 420) for processing at any one time. If blocking filter 330 is a 2D filter, then blocking artifacts in both the horizontal and vertical directions are substantially reduced from the set of 10×10 pixels data sent from buffer 320. If blocking filter 330 is a 1D filter, then blocking artifacts in the horizontal direction are substantially reduced from the set of 10 pixels data sent from buffer 320. Blocking filter 330 then sends the de-blocked video data to ringing filter 340 (step 430). If ringing filter 340 is a 2D filter, then ringing artifacts are substantially reduced from 10×10 pixels data sent from blocking filter 330 in one pass. If ringing filter 340 is a 1D filter, then a first stage de-ringing process is carried out on the 10 pixels data sent from blocking filter 330. If blocking filter 330 and ringing filter 340 are 2D filters (step 440), then the filtering process for the plurality of data of the image frame is completed and the de-blocked and de-ringed video data is then sent to memory 310 via buffer 320 (from ringing filter 340) for storage (step 445). The next step involves a determination of whether all the data in the frame have been filtered (step 447). If so stop. The filtering process may start over for the next video image. If not, steps 410-447 are carried out for the next set of plurality of pixel data. As demonstrated, only 1 memory read and 1 memory write are required for filtering each set of pixel data of a video image when both blocking and ringing filters are two-dimensional.

On the other hand, if blocking filter 330 and/or ringing filter 340 are 1D filters, then the horizontally de-blocked and first-stage de-ringed plurality of video data from ringing filter 340 is then sent to buffer 320 (step 450) thereby skipping steps 445 and 447. Buffer 320 in turns passes them to blocking filter 330 to have the blocking artifacts in the vertical direction removed (step 460). Blocking filter 330 then sends the de-blocked video data to ringing filter 340 which performs a second stage de-ringing process on the video data (step 470). At this point, the blocking and ringing artifacts in the particular set of decompressed video data are substantially reduced and the process is completed. The de-blocked and de-ringed video data is then sent to memory 310 via buffer 320 (from ringing filter 340) for storage (step 480). The next step involves a determination of whether all the data in the video frame have been filtered (step 485). If so the filtering process may start over for the next video frame. If not, steps 410-480 are carried out for the next set/plurality of pixel. In this second pass through the pipeline (which is needed if blocking filter 330 and/or ringing filter 340 are one dimensional filter), due to the use of buffer 725, no additional memory read or memory write are required for filtering each set of the video frame. Hence, the total number of memory reads and memory writes for an implementation involving a 1D blocking filter and a 1D ringing filter in accordance with the present invention is still 1 memory read and 1 memory writes. The same number of memory reads and memory writes are required if one 1D filter and one 2D filter are used.

As demonstrated above, post-processing architecture 300 of the present invention reduces the number of memory accesses required in the process to remove blocking and ringing artifacts from decompressed video (pixel) data when compared with the corresponding filter combination (i.e., two 1D filters, two 2D filters, or one 1D and one 2D filters) in the prior art. Even if the present invention utilizes two 1D filters and the prior art system utilizes two 2D filters, the numbers of memory accesses required in both cases are the same. This reduction in memory access requirement allows for the use of two 1D filters in the preferred embodiment of the present invention. The use of 1D filters is desirable because they tend to be less complex and consequently less expensive than 2D filters. Conversely, 2D filters offer the advantage of more efficient processing.

Figure 5:
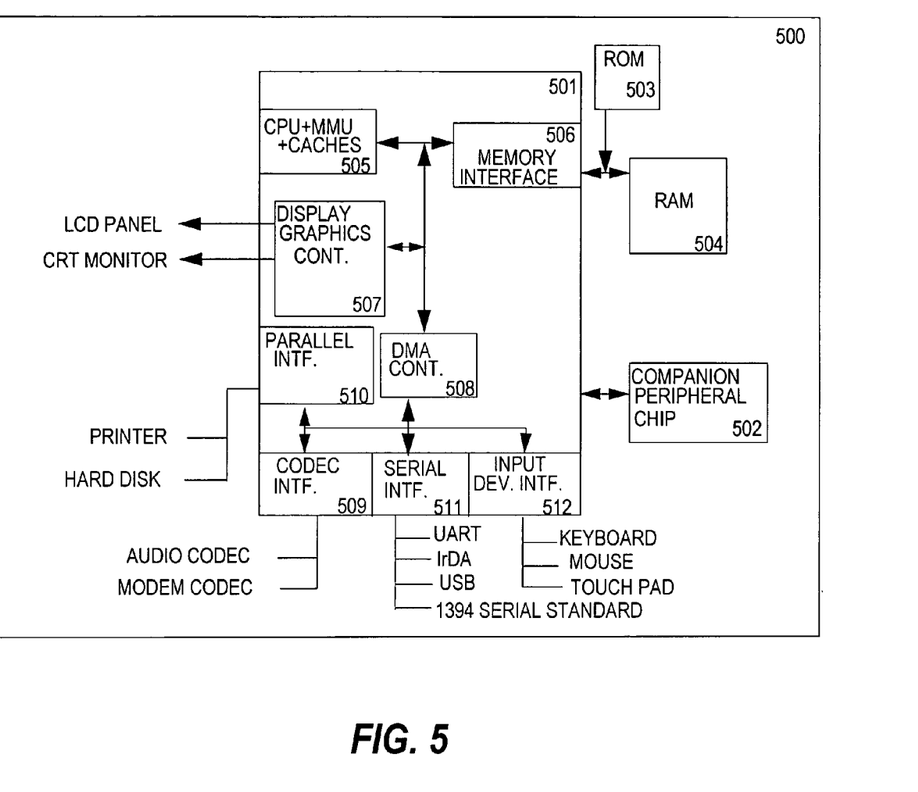
FIG. 5 illustrates, as an example, a high-level diagram of computer system 500 in which the present invention may be implemented or practiced.

Reference is now made to FIG. 5 illustrates, as an example, a high-level diagram of computer system 500 in which the present invention may be implemented or practiced. More particularly, computer system 500 may be a laptop or handheld computer system. It is to be appreciated that computer system 500 is exemplary only and that the present invention can operate within a number of different computer systems including desktop computer systems, general-purpose computer systems, embedded computer systems, and others.

As shown in FIG. 5, computer system 500 is a highly integrated system which includes of integrated processor circuit 501, peripheral controller 502, read-only-memory (ROM) 503, and random access memory (RAM) 504. The highly integrated architecture allows power to be conserved. Peripheral controller 502 is optional if there is a need to interface with complex and/or high pin-count peripherals that are not provided in integrated processor circuit 501.

While peripheral controller 502 is connected to integrated processor circuit 501 on one end, ROM 503 and RAM 504 are connected to integrated processor circuit 501 on the other end. Integrated processor circuit 501 comprises a processing unit 505, memory interface 506, graphics/display controller 507, direct memory access (DMA) controller 508, and core logic functions including encoder/decoder (CODEC) interface 509, parallel interface 510, serial interface 511, and input device interface 512. Processing unit 505 integrates a central processing unit (CPU), a memory management unit (MMU), together with instruction/data caches.

CODEC interface 509 provides the interface for an audio source and/or modem to connect to integrated processor circuit 501. Parallel interface 510 allows parallel input/output (I/O) devices such as hard disks, printers, etc. to connect to integrated processor circuit 501. Serial interface 511 provides the interface for serial I/O devices such as Universal Asynchronous Receiver Transmitter (UART), Universal Serial Bus (USB), and Firewire (IEEE 1394) to connect to integrated processor circuit 501. Input device interface 512 provides the interface for input devices such as keyboard, mouse, and touch pad to connect to integrated processor circuit 501.

DMA controller 508 accesses data stored in RAM 504 via memory interface 506 and provides the data to peripheral devices connected to CODEC interface 509, parallel interface 510, serial interface 511, or input device interface 512. DMA controller 508 also sends data from CODEC interface 509, parallel interface 510, serial interface 511, and input device interface 512 to RAM 504 via memory interface 506. Graphics/display controller 507 requests and accesses the video/graphics data from RAM 504 via memory interface 506. Graphics/display controller 507 then processes the data, formats the processed data, and sends the formatted data to a display device such as a liquid crystal display (LCD), a cathode ray tube (CRT), or a television (TV) monitor. In computer system 500, a single memory bus is used to connect integrated processor circuit 501 to ROM 503 and RAM 504.

Figure 6:
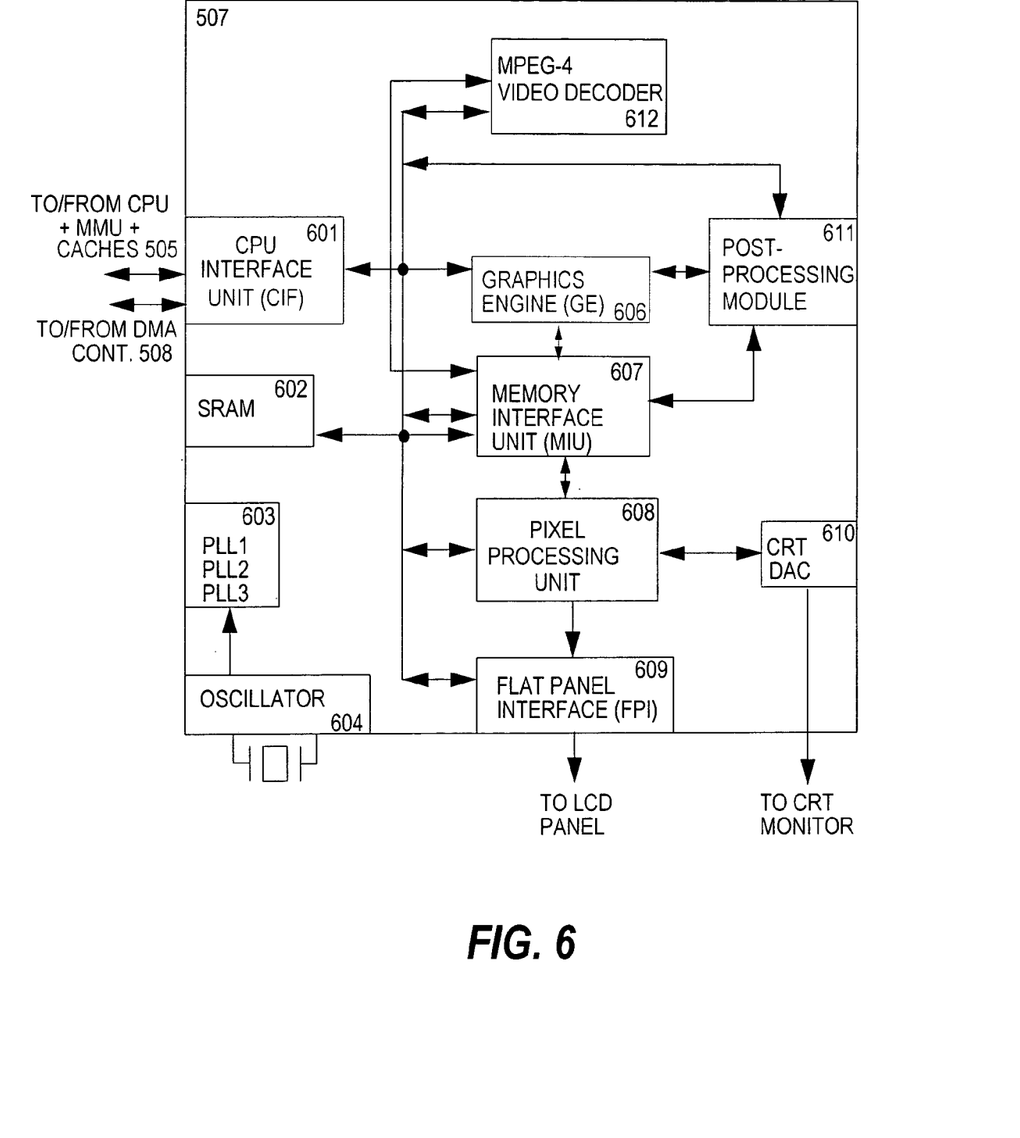
FIG. 6 illustrates in greater detail graphics/display controller 507 that implements an embodiment of the present invention.

In the preferred embodiment, the present invention is implemented as part of graphics/display controller 507. Reference is now made to FIG. 6 illustrating in greater detail graphics/display controller 507. In general, graphics/display controller 507 comprises CPU Interface Unit (CIF) 601, SRAM 602, Phase Lock Loop (PLL) circuit 603, oscillator 604, pixel processing logic 608, Graphics Engine (GE) 606, Memory Interface Unit (MIU) 607, Flat Panel Interface (FPI) 609, CRT Digital-to-Analog Converter (DAC) 610, and post-processing module 611. Additionally, graphics/display controller 507 may optionally include MPEG-video decoder 612. CIF 601 provides the interface to processing unit 505 and DMA controller 508. Accordingly, CIF 601 routes requests and video/image data received from processing unit 505 to the desired destination. In particular, CIF 601 sends register read/write requests and memory read/write requests from the host CPU processing unit 505 and DMA controller 508 to the appropriate modules in graphics/display controller 507. For example, memory read/write requests are passed on to MIU 607 which in turn reads/writes the data from/to the frame buffer in SRAM 602. CIF 601 also serves as the liaison with DMA controller 508 to fetch data from system memory (ROM 503 and RAM 504) and provides the data to GE 606 and MIU 607. Further, CIF 601 has a number of control registers which can be programmed by the host CPU in processing unit 505 to control the MPEG post-processing process (e.g., the content of some of the control registers may be used to configure MPEG-4 decoder 612). CIF 601 can also passes compressed video/image bitstream to MPEG-4 decoder 612 to perform image construction/decompression.

The frame buffer in SRAM 602 is used to store the pixmap (i.e., a pixel pattern mapped into the frame buffer) of the image to be displayed on the monitor as well to act as a temporary buffer for various purposes. Additionally, SRAM 602 also has memory allocated for video buffers and transactional registers. The transactional registers can be used to store quantization factors for each block of video image pixel data. In this embodiment, SRAM 602 performs the same functions as memory 310 of FIG. 3 and more (e.g., storing quantization factors). If graphics/display controller 507 includes MPEG-4 decoder 612, then the transactional registers used in storing quantization factors are preferably implemented inside MPEG-4 decoder 612. Oscillator 604 provides a reference clock signal to PLL circuit 603 which in turn generates three programmable phase lock loop clock signals: PLL1, PLL2, and PLL3 for the different modules in graphics/display controller 507. More particularly, while clock signal PLL1 is used for GE 606 and MIU 607, clock signals PLL2 and PLL3 are used for pixel processing logic 608. GE 606 processes graphics/video image data which is then stored in the buffer in SRAM 602 based on commands issued by the host CPU. GE 606 performs graphics operations (e.g., Bit-BLTs and ROPs, area fills, line drawing) and provides hardware support for clipping, transparency, rotation, and color expansion. In the present embodiment, GE 606 through a built-in Stretch Block Transfer (STRBLT) function further performs video image expansion, progressive scanning conversion, YcbCr (YUV) to RGB color-space conversion, etc. In short, GE 606 frees processing unit 505 from the video/image display rendering function to allow processing unit 505 to perform time-critical or real-time operations.

MIU 607 controls all read and write transactions from/to the frame buffer, video buffers, and transactional registers in SRAM 602. Such read and write requests may come from the host CPU via CIF 601, GE 606, pixel processing logic 608, FPI 609, etc. In addition, MIU 607 performs tasks associated with memory addressing, memory timing control, and others. In accordance with the present invention, post-processing module 611 removes blocking and ringing artifacts from decompressed MPEG video image data to improve the quality of the decompressed video data. The decompressed MPEG video image data can be received from, for example, an optical media player via serial interface 511 or MPEG-4 decoder 612. The filtered video image data is then sent to SRAM 602.

Pixel processing logic 608 retrieves video/image data from the buffers in SRAM 602 via MIU 607, serializes the image data into pixels, and formats the pixels into predetermined formats before outputting them to FPI 609 or CRT DAC 610. Accordingly, pixel processing logic 608 generates the required horizontal and vertical display timing signals, memory addresses, read requests, and control signals to access image data stored in SRAM 602. If the display device involved is a LCD, pixel data from pixel processing logic 608 is sent to FPI 609 before being passed on to the LCD. FPI 609 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 609 formats the data to suit the type of display. Furthermore, FPI 609 allows color data to be converted into monochrome data in the event a monochrome LCD is used. Conversely, if the display device is a cathode ray tube (CRT), pixel data is provided to CRT digital-to-analog converter (DAC) 610 prior to being sent to the CRT. CRT DAC 610 converts digital pixel data from pixel processing logic 608 to analog Red Green and Blue (RGB) signals to be displayed on the CRT monitor.

Figure 7:
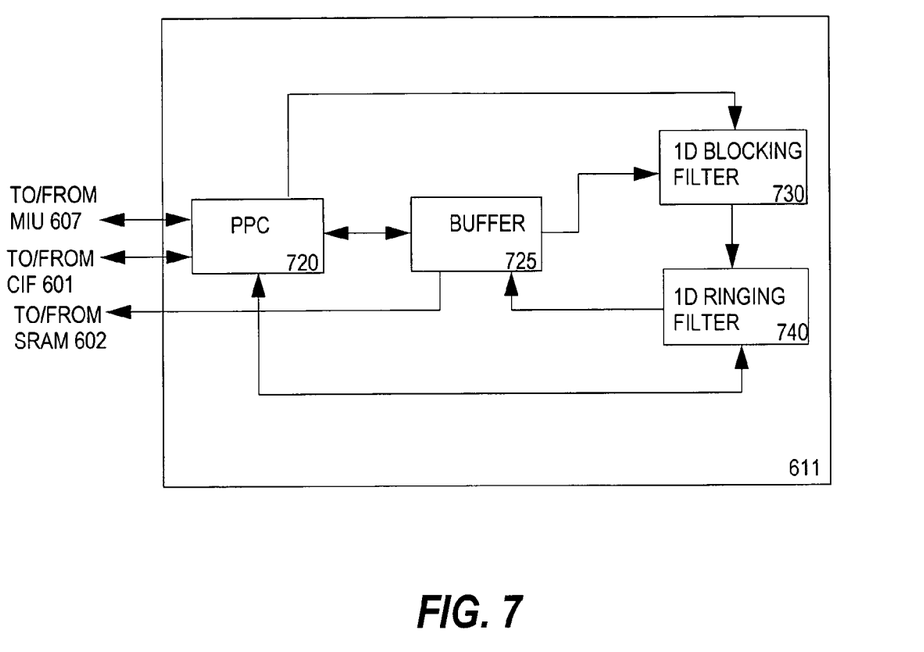
FIG. 7 illustrates a block diagram of post-processing module 611 that implements and embodiment of the present invention.

Reference is now made to FIG. 7 illustrating in greater detail post-processing module 611 that implements an embodiment of the present invention. As shown in FIG. 7, post-processing module 611 comprises post-processing controller (PPC) 720, buffer 725 (which performs the same functions as buffer 320 in FIG. 3 above), blocking filter 730, and ringing filter 740. Post-processing module 611 is connected externally to MIU 607, SRAM 602, GE 606, and CIF 601. In the preferred embodiment, both blocking filter 730 ringing filter 740 are 1D filters. However, the scope of the present invention also extends to the use of two 2D filters as well as a combination of one 1D filter and one 2D filter. Moreover, in the current embodiment, blocking filter 730 is placed in front of ringing filter 740 in the "pipeline", it should be clear that the scope of the present invention also covers the embodiment where the de-ringing process is carried out before the de-blocking process (i.e., ringing filter 740 is placed in front of the blocking filter 730 in the pipeline). Furthermore, in the current embodiment, horizontal blocking artifacts are reduced first and vertical blocking artifacts are reduced second, it should be clear that the scope of the present invention also covers the embodiment where the vertical blocking artifacts are removed before horizontal blocking artifacts are removed. Finally, in the current embodiment, the de-ringing process is carried out in two stages.

In post-processing a video image file, PPC 720 reads the programmed instructions in the registers in CIF 601 which instruct PPC 720 to begin post-processing a decompressed video frame from a video image file stored in the buffers of SRAM 602. The video image file preferably has a YUV 4:2:0 color-space format. In the present embodiment, a video frame is divided into 8×8 pixels blocks and each block is subdivided into six sections wherein four sections are reserved for Y (luminance) components data, one section is reserved for U component data, and one section is reserved for V component data. It should be clear that other color-space formats can also be implemented. The registers in CIF 601 also provides to PPC 720 control information corresponding to the video data such as whether a blocking filter, a ringing filer, or both are used in the pipeline, whether 1D or 2D filters are involved, whether the horizontal or vertical artifacts are removed first, whether de-blocking process is carried out before de-ringing process, and memory addresses of input data and output data. In the current embodiment, two 1D filters are used and the horizontal artifacts are removed before the vertical artifacts are removed. In response to the programmed instructions, PPC 720 communicates with MIU 607 to retrieve a set of a video data as well as the corresponding quantization factors from SRAM 602. The corresponding quantization factors can also be retrieved from the transactional registers in MPEG-4 decoder 612 if such decoder is implemented. Responding to PPC 720 request, MIU 607 then instructs SRAM 602 to send to buffer 725 sets of video data (e.g., each set preferably contains 10 pixels data) and the corresponding quantization factors (if they are stored in SRAM 602). If the quantization factors are stored in MPEG-4 decoder 612, then PPC 720 makes a request to MPEG-4 decoder 612. PPC 720 also forwards the information from the programmed registers in CIF 601 to buffer 725.

PPC 720 controls the horizontal de-blocking and first-stage de-ringing processes on the video data. Under the control of PPC 720, buffer 725 forwards the video data and quantization factors to 1D blocking filter 730 which utilizes the quantization factors to filter horizontal blocking artifacts from the video data. Under the control of PPC 720, the horizontally de-blocked video data set from blocking filter 730 along with the quantization factors are then sent to 1D ringing filter 740 to carry out first stage de-ringing process on the video data. In response to the request from PPC 720, the horizontally de-blocked and first-stage de-ringed video data from ringing filter 740 is then sent back to buffer 725.

PPC 720 then initiates the vertical de-blocking and second-stage de-ringing processes from the horizontally de-blocked and first-stage de-ringed set of video data. Under the control of PPC 720, buffer 725 forwards the horizontally de-blocked and first-stage de-ringed video data set along with the quantization factors to 1D blocking filter 730 which utilizes the quantization factors to filter vertical blocking artifacts from the video data set. Under the control of PPC 720, the vertically de-blocked video data set from blocking filter 730 along with the quantization factors are then sent to 1D ringing filter 740 to perform a second-stage de-ringing process on the video data. In response to the request from PPC 720, the horizontally and vertically de-blocked and two-stages de-ringed video data set from ringing filter 740 is then sent to a location in SRAM 602 whose memory address is stored in buffer 725. It should be clear that if a 2D blocking filter and a 2D ringing filter are used, then the second pass of the process can be eliminated because both horizontal and vertical artifacts can be substantially reduced in one pass of the process. PPC 720 monitors and carries out the above processes for the remaining video data in the video frame. To help in monitoring the video data post processing, information related to a set of video data (e.g., information identifying the location of a set of video data in a video data frame, information specifying the order number of a set of video data relative to the order numbers of remaining sets of video data in a frame, etc.) may be sent together with the set of video data, for example as part of its header information, when the set of video data is travels along post-processing pipeline described above.

Figure 8:
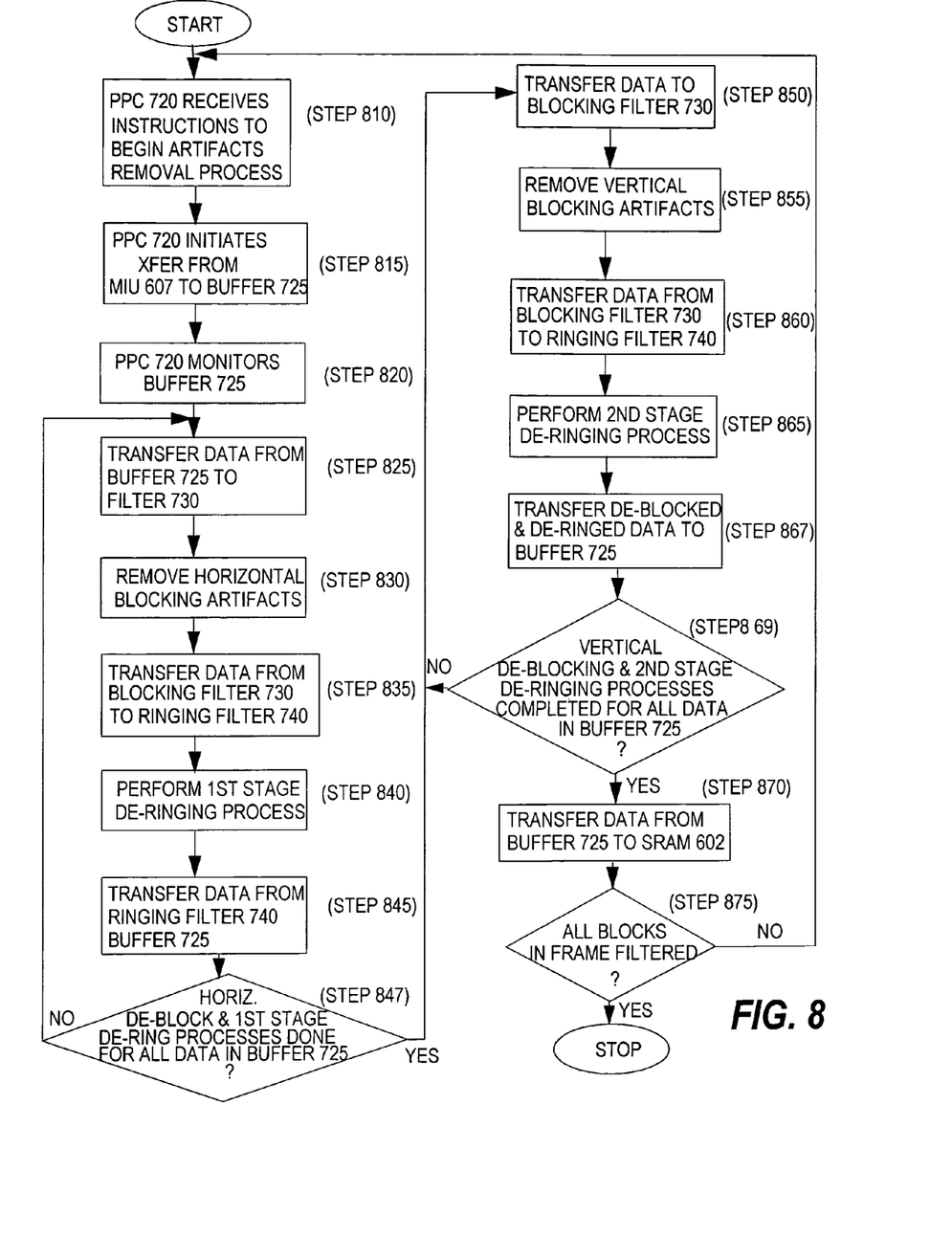
FIG. 8 illustrates a flow chart of the steps that are carried out by state machine PPC 720.

Referring to FIG. 8 illustrating the relevant steps/states that are carried out by state machine PPC 720. In the present embodiment, the steps/states in FIG. 8 are implemented as part of a state machine. In step 810, PPC 720 receives instruction to begin the artifacts removal process. PPC 720 then communicates with MIU 607 to request for the set of decompressed video data that belongs to a plurality (e.g., two) of adjacent blocks of a video frame to be sent to buffer 725 (step 815). This set of video data sent to buffer 725 is preferably 10×10 pixels. PPC 720 monitors buffer 725 to see if the video data has been received (step 820). PPC 720 then requests buffer 725 to send a plurality of video data (e.g., 10 pixels) to blocking filter 730 (step 825). Control information such as whether a blocking filter is implemented, whether a ringing filter is implemented, memory address for the set of video data, etc, are made available to filters 730 and 740, for example as part of the header of the video data, to signal a particular filter to turn on or off. Blocking filter 730 reduces the blocking artifacts in the horizontal direction (step 830). After blocking filter 730 completes reducing blocking artifacts, the de-blocked plurality of video data is transferred to ringing filter 740 (step 835). Ringing filter 740 carries out a first-stage de-ringing process on the video data (step 840). After ringing filter 740 completes the first-stage de-ringing process, the de-blocked and de-ringed plurality of video data is transferred to buffer 725 for storage (step 845). By utilizing buffer 725 for storing the horizontally de-blocked and first-stage de-ringed video data in the interim, access to SRAM 602 via MIU 607 is minimized. Only one read and one write to SRAM 602 is needed.

Next, a determination is made whether horizontal de-blocking and first-stage de-ringing processes have been carried out on the entire set (10×10 pixels) of video data stored in buffer 725 (step 847). If no, steps 825-845 are repeated. If yes, PPC 720 is ready to begin the removing blocking artifacts in the vertical direction from the video data. PPC 720 requests buffer 725 to send the horizontal de-blocked and first-stage de-ringed set of video data to blocking filter 730 to have the blocking artifacts in the vertical direction removed (step 850). Blocking filter 730 reduces the blocking artifacts in the vertical direction by (step 855). After blocking filter 730 completes reducing blocking artifacts, the de-blocked video data is transferred to ringing filter 740 (step 860). Ringing filter carries out a second-stage de-ringing process on the video data (step 865). After ringing filter 740 completes the second-stage de-ringing process, the blocking and ringing artifacts of the particular set of decompressed video data are substantially reduced and the data is then transferred to buffer 725 (step 867). Next, a determination is made whether vertical de-blocking and second-stage de-ringing processes have been carried out on the entire set (10×10 pixels) of video data stored in buffer 725 has been removed (step 869). If no, steps 850-867 are repeated. If yes, PPC 720 requests buffer 725 to send the horizontally and vertically de-blocked and two-stages de-ringed video data to SRAM 602 for storage (step 870). The next step involves a determination of whether all the data in the video frame have been filtered (step 875). If so the filtering process may start over for the next video frame. If not, steps 810-875 are carried out for the next set of video data. By utilizing buffer 725 for storing the horizontally de-blocked and first-stage de-ringed video data before the set of video data is passed the second time through the pipeline for removal of artifacts in the vertical direction, access to SRAM 602 via MIU 607 is minimized. Only one read and one write to SRAM 602 is needed.

Figure 9:
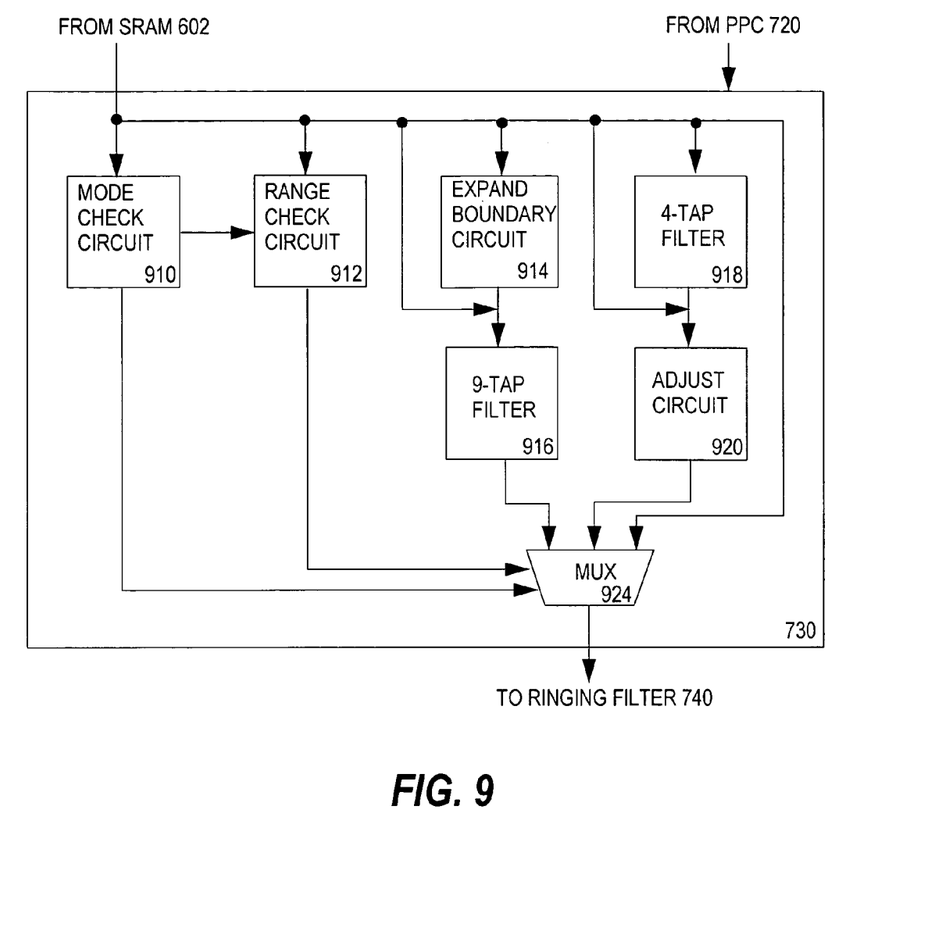
FIG. 9 illustrates in greater detail an embodiment of 1D blocking filter 730.

FIG. 9 illustrates a block diagram of blocking filter 730 in accordance to the preferred embodiment of the present invention. Blocking filter 730 implements the de-blocking algorithm taught in "MPEG-4 Information Technology-Coding of Audio-Visual Objects-Part 2: Visual" ISO/IEC/14496-2: 1999, Annex F.3.1, p. 291-295 which generally adopts the teachings of a research paper titled "A Deblocking Filter with Two Separate Modes in Block-Based Video Coding" by S. D. Kim, J. Yi, and J. B. Ra, IEEE Trans. Circuit Systems Video Techno. (February 1999). These materials are herein incorporated by reference in their entirety. In general, blocking filter 730 takes advantages of the fact that the human visual system is more sensitive to blocking artifacts in flat regions than in complex regions, that smoothing operations tend to introduce undesirable blur in complex regions than flat regions, and blocking artifacts which propagates are more visible in the flat regions. Accordingly, a strong smoothing filter (e.g., a 9-tap filter) is used in the flat regions to cover the inside of the block in addition to block boundaries. In complex regions, an accurate and adaptive smoothing filter (e.g., a 4-tap filter) to preserve image details is used.

As shown in FIG. 9, blocking filter 730 comprises mode check circuit 910, range check circuit 912, expand boundary circuit 914, 9-tap filter 916, 4-tap filter 918, adjust circuit 920, and multiplexer 924. Typically a plurality of pixel data (e.g., a row of ten pixel data or a column of ten pixel data) from between a plurality (e.g., two) of horizontally or vertically (depending on whether artifacts in the horizontal or vertical direction are being removed at the time) adjacent 8×8 blocks of video data along with the quantization factors are sent (at any one time) from buffer 725 to mode check circuit 910, range check circuit 912, expand boundary 914, 4-tap filter 918, adjust circuit 920, and multiplexer 924. In one embodiment, the right quantization factors of the macro block in 4:2:0 color space format (16×16 luminance component (Y) pixels and 8×8 chrominance (UV) components pixels) are used for horizontal artifacts removal and the lower quantization factors of the macro block is used for vertical artifacts removal. Alternatively, the average of the quantization factors of two adjacent macro blocks may be used.

Mode check circuit 910 computes the value for ModeCheck based on the equations:

$$\text{Eq\_cnt} = \Sigma(|v[j+1] - v[j]|), j = 0, 1, \ldots 8$$
$$\text{where } (|v[j+1] - v[j]|) = 1 \text{ if } \leq 2$$
$$= 0 \text{ otherwise}$$

v[j] and v[j+1] are adjacent pixels intensity $$ModeCheck = 1 \text{ if } (Eq\_cnt >= 6)$$
$$= 0 \text{ otherwise}$$

The value of ModeCheck is used to determine whether the video data block is in the flat or complex region.

Range check circuit 912 computes the value for RangeCheck based on the equation:

$$\text{RangeCheck} = (\text{Max}(v[1\text{-to-}8]) - \text{Min}(v[1\text{-to-}8])) <= 2*Qp)$$

where v[1-to-8] is intensity of pixels 1 to 8 and Qp is the quantization factor to which pixel 5 (from the left for horizontal artifact removal and from the top for vertical artifact removal) of the video block belong.

The value of RangeCheck is used to prevent real edges (i.e., when difference between the maximum value and the minimum value of the pixels in the video block is larger than 2Qp) in the video block data from being smoothed. The ModeCheck and RangeCheck values are provided as select values for multiplexer 924.

Expand boundary circuit 914 pads pixels to the beginning and end of the video block data to expand the block. This is required before the video block data can be provided as input to 9-tap filter 916. Expand boundary circuit 914 implements the following equations:

$$TempCopy(j+3) = v(j), j = 0, 1, \ldots 8$$
$$TempCopy(0-\text{to}-3) = v[0] \text{ if } (|v[0] - v[1]|) < Qp$$
$$= v[1] \text{ otherwise}$$
$$TempCopy(12-\text{to}-15) = v[9] \text{ if } (|v[9] - v[8]|) < Qp$$
$$= v[8] \text{ otherwise}$$

9-tap filter 916 is the strong smoothing filter used in flat regions. 9-tap filter 916 provides its output value outV as an input to multiplexer 924, wherein:

$$\text{Out } V[j] = 1 \text{ if } (4*TempCopy[j+3] + 2*(TempCopy[j+1] +$$
$$TempCopy[j+2] + TempCopy[j+4] +$$
$$TempCopy[j+5] + TempCopy[j-1] +$$
$$TempCopy[j] + TempCopy[j+6] +$$
$$TempCopy[j+7] + 8) \gg 4$$
$$= 0 \text{ otherwise}$$
$$\text{Out } V[0] = V[0]$$
$$\text{Out } V[9] = V[9]$$

4-tap filter 918 computes values a0, a1, and a3 based on the following equations:

$$a0 = (2*v[3] - 5*(v[4] - v[5]) - 2*v[6])/8$$
$$a1 = (2*v[1] - 5*(v[2] - v[3]) - 2*v[4])/8$$
$$a3 = (2*v[5] - 5*(v[6] < v[7]) - 2*v[8])/8$$

4-tap filter 918 then provides values a0, a1, and a3 as its output to adjust circuit 920. 4-tap filter 918 when combined with adjust circuit 920 limit the pixels to smooth to the two block boundary pixels v4 and v5. The DCT coefficients a0, a1, and a3 are used in determining the feature information of the pixel data around the block boundary to reduce the block discontinuity.

Adjust circuit 920 computes the following equations:

$$b = (|a0| - \min(|a0|, |a1|, |a2|))$$
$$c = -b*5/8 \text{ if } a0 > 0$$
$$= b*5/8 \text{ otherwise}$$
$$d = (v[4] - v[5])/2$$
$$e = \min(|c|, |d|) * \text{sign}(c) \text{ if sign}(c) = \text{sign}(d)$$
$$= 0 \text{ otherwise}$$
$$f = e \text{ if } |a0| < Qp$$
$$= 0 \text{ otherwise}$$
$$\text{Out } V[4] = v[4] - f$$
$$\text{Out } V[5] = v[5] + f$$
$$\text{Out } V[j] = v[j] \text{ where } j = 0 - \text{to} - 3 \text{ and } 6 - \text{to} - 9$$

Adjust circuit 920 may be efficiently implemented in hardware according to the following coding:

$$a0 = (2*v[3] - 5*(v[4] - v[5]) - 2*v[6])$$
$$a1 = (2*v[1] - 5*(v[2] - v[3]) - 2*v[4])$$
$$a3 = (2*v[5] - 5*(v[6] - v[7]) - 2*v[8])$$
$$b = ((|a0| - \min(|a0|, |a1|, |a2|))*5) \gg 5)$$
$$d = (v[4] - v[5])$$
$$e = ((\min(|b|, |d|)) \gg 1)) \text{ if } (\text{sign}(a0) != \text{sign}(d))$$
$$= 0 \text{ otherwise}$$
$$f = e \text{ if } (|a[0]| < (Qp \ll 3)$$

-continued $$= 0 \text{ otherwise}$$
$$\text{Out } V[4] = v[4] - f$$
$$\text{Out } V[5] = v[5] + f$$
$$\text{Out } V[j] = v[j] \text{ where } j = 0 - \text{to} - 3 \text{ and } 6 - \text{to} - 9$$

Generally, the scaling/compensating factor is reduced when neighboring blocks are more flat to prevent undesirable blurring. The values of OutV[4] and OutV[5] from adjust circuit 920 together with OutV[j] where j=0-to-3 and 6-to-9 are output to multiplexer 924.

Multiplexer 924 provides as its output either the video blocking data, the output of 9-tap filter 916, or the output of 4-tap filter 918 via adjust circuit 920 depending on the select inputs from modecheck circuit 910 and rangecheck circuit 912. Table 1 below illustrates the output of multiplexer 926 with respect to select inputs ModeCheck and RangeCheck.

TABLE 1

| Mode Check | Range Check | Output |
|---|---|---|
| True | True | From 9-Tap Filter |
| True | False | Bypass Both 4-tap & 9-tap Filters |
| False | True | From 4-Tap Filter via Adjust Circuit 920 |
| False | False | From 4-Tap Filter via Adjust Circuit 920 |

Figure 10:
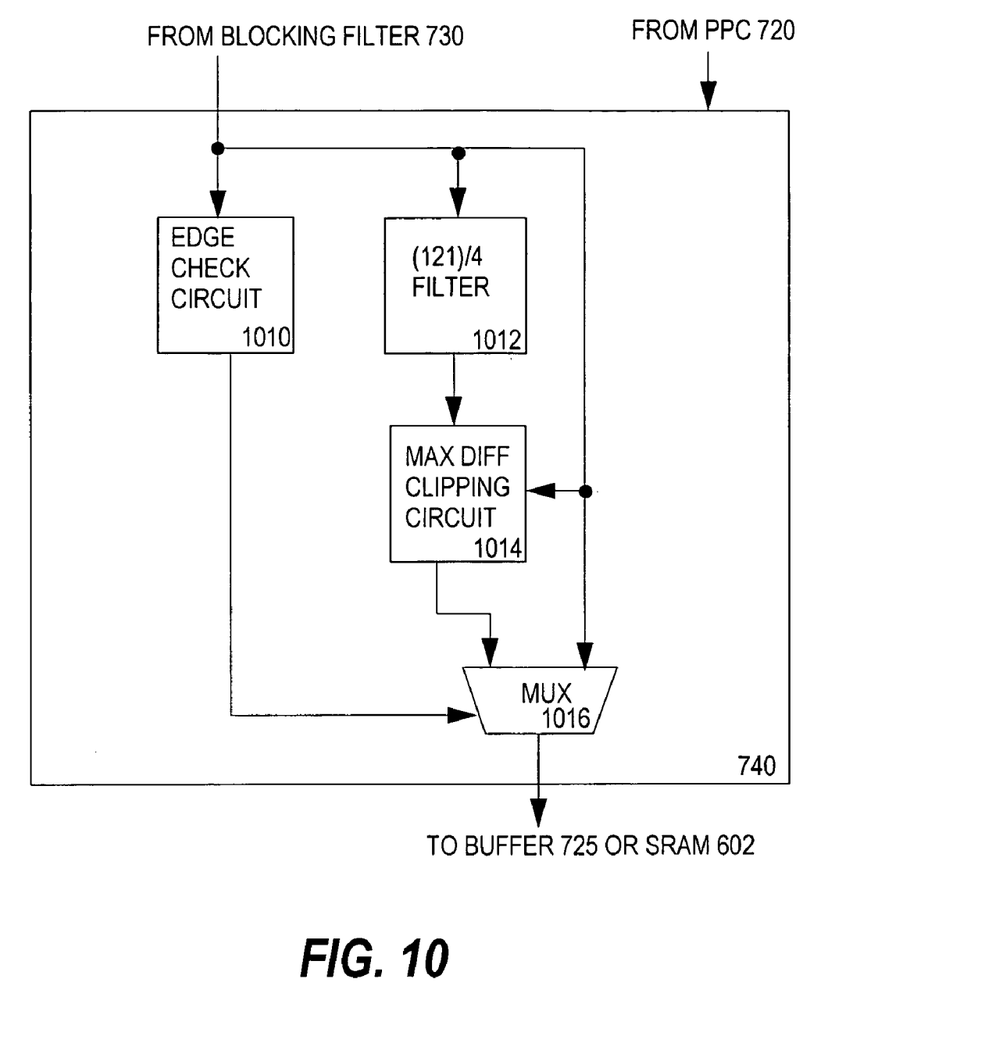
FIG. 10 illustrates in greater detail an embodiment of 1D ringing filter 740.

FIG. 10 illustrates a block diagram of ringing filter 740 in accordance to the preferred embodiment of the present invention. Ringing filter 740 implements a modified and simplified de-ringing algorithm from the one taught in "MPEG-4 Information Technology-Coding of Audio-Visual Objects-Part 2: Visual" ISO/IEC/14496-2:1999, Annex F.3.1, p. 291-295). This material is herein incorporated by reference in their entirety. While the algorithm taught in ISO/IEC/14496-2: 1999 is for a 2D ringing filter, it was simplified and, adapted in the present invention as a 1D ringing filter. While the MPEG-4 2D ringing filter loads 18×18 pixels data at any one time for processing, ringing filter 740 of the present invention only loads 10 pixel data for processing at any one time. The MPEG-4 2D ringing filter performs the following steps: 1) determining the threshold value based on the calculated maximum and minimum intensity values within a block of the decompressed image; 2) assigning the binary index value to each pixel in the block to generate a binary index map using the threshold value determined; 3) using the binary index map to select the pixels to apply the filtering process; and 4) apply the filtering process to the selected pixels. Conversely, ringing filter 740 of the present invention generally performs the following steps: 1) performs an edge detection before filtering; 2) if the data involved constitutes an edge of an image, then no filtering is performed to prevent the image details from being distorted by filtering; 3) otherwise, carry out the filtering process using the quantization factor Qp.

As shown in FIG. 10, ringing filter 740 comprises edge check circuit 1010, (121)/4 filter 1012, MaxDiff Clipping Circuit 1014, and multiplexer 1016. Typically some pixel data (e.g., a row of ten pixel data or a column of ten pixel data) from an 8×8 block of video data along with the quantization factors are sent (at any one time) from blocking filter 730 to edge check circuit 1010, (121)/4 filter 1012, MaxDiff clipping circuit 1014, and multiplexer 1016. Edge check circuit 1010 computes the value for EdgeCheck based on the equations:

$$EdgeCheck[j] = 1 \text{ if } \max(|data [j] - data [j+1]|, |data [j]$$
$$- data [j-1]|) >= 16$$
$$\text{or} = 1 \text{ if } \min(|data [j] - data [j+1]|, |data [j]$$
$$- data [j-1]|) >= 8$$
$$= 0 \text{ otherwise}$$

where j=1, . . . 8 and data[j], data[j+1], and data[j−1] are the intensity value of three adjacent pixels. Hence, only the middle eight pixel data are processed.

Hence, an edge is detected if the maximum difference in intensity between three adjacent pixels is greater than 16 or if the minimum difference in intensity between three adjacent pixels is greater than 8. The edge check is performed on the middle 8 pixels. The EdgeCheck value is provided as an input select signal to multiplexer 1016.

(121)/4 filter 1012 computes a filtered pixel value data0[j] by using the values 1, 2, and 1 as the coefficients for a polynomial involving three adjacent pixels based on the following equation:

$$data0[j]=(data[j-1]+2*data[j]+data[j+1])>>2$$

where j=1, . . . 8 and data[j], data[j+1], and data[j−1] are the original (unfiltered) intensity value of three adjacent pixels.

The pixel value computed by (121)/4 filter 1012 is provided as an input to MaxDiff clipping circuit 1014 which computes the clipped filtered pixel value Data1[j] based on the following equation:

$$Data1[j]=\min(\max(data0[j],data[j]-MaxDiff), data[j]+MaxDiff)$$

where MaxDiff=(Qp+4)/8+2, Qp=the quantization factor, and j=1, . . . 8

Essentially, MaxDiff clipping circuit 1014 maintains the filtered pixel value to the range of (data0[j]−MaxDiff) and (data0[j]+MaxDiff). Anything above this range is clipped off.

Multiplexer 1016 outputs either the clipped filtered pixel value Data1[j] from MaxDiff clipping circuit 1014 or the original (unfiltered) pixel value depending on whether an edge is detected based on the value of Edgecheck[j].

Although the preferred embodiment uses a 1D blocking filter and a 1D ringing filter, the present invention can also be implemented using two 2D filters or one 1D and one 2D filters. There are a number of existing 2D ringing filters and 2D blocking filters. For example, a 2D ringing filter is taught in "MPEG-4 Information Technology-Coding of Audio-Visual Objects-Part 2: Visual" ISO/IEC/14496-2:1999, Annex F.3.1, p. 291-295). A 2D blocking filter is taught, for example, in "A DCT-based Spatially Adaptive Post-Processing Technique to Reduce the Blocking Artifacts in Transform Coded Images" by H. Paek, R. Kim, and S. Lee, IEEE Trans. Circuits Syst. Video Technol., (October 2000). These materials are incorporated herein by reference in their entirety.

An embodiment of the present invention, a system, apparatus, and method to remove artifacts introduced into decompressed video data is presented. While the present invention has been described in particular embodiments, the present invention should not be construed as limited by such embodiments, but rather construed according to the below claims.

What is claimed is:

1. A post-processing component comprising:
   a blocking filter operable to access decompressed video data and quantization factors associated with decompressed video data, wherein the blocking filter is further operable to remove first blocking artifacts from said decompressed video data using said quantization factors to generate second data; and a ringing filter coupled to the blocking filter, wherein the ringing filter is operable to access said quantization factors associated with said decompressed video data, wherein said ringing filter is further operable to remove first ringing artifacts from said second data using said quantization factors to generate third data; and wherein said blocking filter is further operable to remove second blocking artifacts from said third data using said quantization factors to generate fourth data.

2. The post-processing component of claim 1, wherein said first blocking artifacts comprise horizontal blocking artifacts.

3. The post-processing component of claim 1, wherein said second blocking artifacts comprise vertical blocking artifacts.

4. The post-processing component of claim 1, wherein said ringing filter is further operable to remove second ringing artifacts from said fourth data using said quantization factors to generate fifth data.

5. The post-processing component of claim 1, wherein said blocking filter is selected from a group consisting of a one-dimensional blocking filter and a two-dimensional blocking filter.

6. The post-processing component of claim 1, wherein said ringing filter is selected from a group consisting of a one-dimensional ringing filter and a two-dimensional ringing filter.

7. The post-processing component of claim 1, wherein said blocking filter is further operable to perform processing selected from a group consisting of mode check processing and range check processing.

8. The post-processing component of claim 1, wherein said ringing filter is further operable to perform edge check processing.

9. The post-processing component of claim 1, wherein said ringing filter is further operable to filter said second data based upon at least one intensity value associated with at least one adjacent pixel to generate sixth data, and wherein said ringing filter is further operable to clip a portion of said sixth data to generate said third data, wherein said portion of said sixth data exceeds a predetermined range associated with at least one of said quantization factors.

10. A system comprising:
a processor;
a memory coupled to said processor;
a video interface coupled to said processor, wherein said video interface is operable to receive video data from a video source;
a display coupled to said processor;
a graphics controller coupled to said processor, wherein said graphics controller comprises:
a graphics engine;
a memory coupled to the graphics engine; and
a post-processing component coupled to the graphics engine and said memory, wherein said post-processing component comprises:
a blocking filter operable to access decompressed video data and quantization factors associated with decompressed video data, wherein the blocking filter is further operable to remove first blocking artifacts from said decompressed video data using said quantization factors to generate second data; and
a ringing filter coupled to the blocking filter, wherein the ringing filter is operable to access said quantization factors associated with said decompressed video data, wherein said ringing filter is further operable to remove first ringing artifacts from said second data using said quantization factors to generate third data; and wherein said blocking filter is further operable to remove second blocking artifacts from said third data using said quantization factors to generate fourth data.

11. The system of claim 10, wherein said first blocking artifacts comprise horizontal blocking artifacts.

12. The system of claim 10, wherein said second blocking artifacts comprise vertical blocking artifacts.

13. The system of claim 10, wherein said ringing filter is further operable to remove second ringing artifacts from said fourth data using said quantization factors to generate fifth data.

14. The system of claim 10, wherein said blocking filter is selected from a group consisting of a one-dimensional blocking filter and a two-dimensional blocking filter.

15. The system of claim 10, wherein said ringing filter is selected from a group consisting of a one-dimensional ringing filter and a two-dimensional ringing filter.

16. The system of claim 10, wherein said blocking filter is further operable to perform processing selected from a group consisting of mode check processing and range check processing.

17. The system of claim 10, wherein said ringing filter is further operable to perform edge check processing.

18. The system of claim 10, wherein said ringing filter is further operable to filter said second data based upon at least one intensity value associated with at least one adjacent pixel to generate sixth data, and wherein said ringing filter is further operable to clip a portion of said sixth data to generate said third data, wherein said portion of said sixth data exceeds a predetermined range associated with at least one of said quantization factors.

19. A method of removing artifacts from decompressed video data, said method comprising:
accessing decompressed video data and quantization factors associated with said decompressed video data;
removing first blocking artifacts from said decompressed video data using said quantization factors to generate second data, wherein said removing first blocking artifacts further comprises removing said first blocking artifacts using a blocking filter;
removing first ringing artifacts from said second data using said quantization factors to generate third data, wherein said removing first ringing artifacts further comprises removing said first ringing artifacts using a ringing filter; and
removing second blocking artifacts from said third data using said quantization factors to generate fourth data.

20. The method of claim 19, wherein said removing first blocking artifacts further comprises removing horizontal blocking artifacts.

21. The method of claim 19, wherein said removing second blocking artifacts further comprises removing vertical blocking artifacts.

22. The method of claim 19 further comprising:
removing second ringing artifacts from said fourth data using said quantization factors to generate fifth data.

23. The method of claim 19, wherein said removing first blocking artifacts and said removing second blocking artifacts are performed by a de-blocking module, and wherein said de-blocking module is selected from a group consisting of a one-dimensional de-blocking module and a two-dimensional de-blocking module.

24. The method of claim 19, wherein said removing first ringing artifacts is performed by a de-ringing module, and wherein said de-ringing module is selected from a group consisting of a one-dimensional de-ringing module and a two-dimensional de-ringing module.

25. The method of claim 19, wherein said removing first blocking artifacts and said removing second blocking artifacts each further comprise performing processing selected from a group consisting of mode check processing and range check processing.

26. The method of claim 19, wherein said removing first ringing artifacts further comprises performing edge check processing.

27. The method of claim 19, wherein said removing first ringing artifacts further comprises:
   filtering said second data based upon at least one intensity value associated with at least one adjacent pixel to generate sixth data; and
   clipping a portion of said sixth data to generate said third data, wherein said portion of said sixth data exceeds a predetermined range associated with at least one of said quantization factors.

* * * * *